United States Patent
Kern et al.

(10) Patent No.: US 10,124,920 B2
(45) Date of Patent: Nov. 13, 2018

(54) METHOD AND APPARATUS FOR FILLING PACKS WITH PRODUCTS

(71) Applicant: FOCKE & CO. (GMBH & CO. KG), Verden (DE)

(72) Inventors: Wolfgang Kern, Bad Zwischenahn (DE); Falko Böger, Emden (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 870 days.

(21) Appl. No.: 14/435,401

(22) PCT Filed: Oct. 10, 2013

(86) PCT No.: PCT/EP2013/003051
§ 371 (c)(1),
(2) Date: Apr. 13, 2015

(87) PCT Pub. No.: WO2014/079525
PCT Pub. Date: May 30, 2014

(65) Prior Publication Data
US 2015/0232219 A1 Aug. 20, 2015

(30) Foreign Application Priority Data
Nov. 23, 2012 (DE) .......................... 10 2012 022 855

(51) Int. Cl.
*B65B 57/20* (2006.01)
*B65B 35/38* (2006.01)
(Continued)

(52) U.S. Cl.
CPC .............. *B65B 57/20* (2013.01); *B65B 5/105* (2013.01); *B65B 35/38* (2013.01); *B65B 57/10* (2013.01)

(58) Field of Classification Search
None
See application file for complete search history.

(56) References Cited

U.S. PATENT DOCUMENTS 5,406,770 A * 4/1995 Fikacek .................. B65B 5/105
  53/155
6,022,187 A * 2/2000 Focke .................... B65G 47/91
  294/183

(Continued)

FOREIGN PATENT DOCUMENTS

CN 1235921 A 11/1999
CN 1530292 A 9/2004
(Continued)

OTHER PUBLICATIONS

Deutsches Patent—und Markenamt, Recherchebericht (patent search in priority application), Jul. 5, 2013.
(Continued)

*Primary Examiner* — Hemant M Desai
*Assistant Examiner* — Tanzim Imam
(74) *Attorney, Agent, or Firm* — Laurence P. Colton; Smith Tempel Blaha LLC

(57) ABSTRACT

A method for filling packs with products, in particular for filling boxes with multipacks of cigarette packs in which several products are put together to form a product group. The completeness of the product group is detected by a first control device. Several product groups are put together by a handling device to form a group of product groups and are inserted into the pack, wherein the presence of the group in the pack and/or the completeness of the group of product groups is detected by a second control device. The feeding of groups to the pack is repeated where necessary until a provided number of groups have been filled into the pack, which corresponds to a required quantity of groups or product groups in the pack, and the presence of the groups in the pack is detected or documented by a control device, in particular the second control device.

10 Claims, 12 Drawing Sheets

(51) Int. Cl.
   *B65B 5/10*   (2006.01)
   *B65B 57/10*   (2006.01)

(56) References Cited

U.S. PATENT DOCUMENTS

| | | | | |
|---|---|---|---|---|
| 6,164,045 A | * | 12/2000 | Focke | B65B 5/105 |
| | | | | 198/429 |
| 2006/0262293 A1 | * | 11/2006 | Sacher | A24C 5/3412 |
| | | | | 356/124 |

FOREIGN PATENT DOCUMENTS

| | | |
|---|---|---|
| CN | 101525061 A | 9/2009 |
| CN | 201849682 U | 6/2011 |
| DE | 4434866 A1 | 4/1996 |
| DE | 69602664 T2 | 12/1999 |
| DE | 10027814 A1 | 12/2001 |
| DE | 102007045883 A1 | 4/2009 |
| DE | 102010021851 A1 | 12/2011 |
| EP | 0090123 A1 | 10/1983 |
| EP | 0855342 A1 | 7/1998 |
| WO | WO 2009043411 A1 * 4/2009 ............... B65B 5/06 |
| WO | 2012084089 A1 | 6/2012 |

OTHER PUBLICATIONS

WIPO, International Search Report (in parent application), dated Jul. 7, 2014.

State Intellectual Property Office of the People's Republic of China, Notification of the First Office Action (on a related application), dated Dec. 31, 2015.

European Patent Office, Office Action issued on a related patent application, dated Feb. 6, 2017.

* cited by examiner

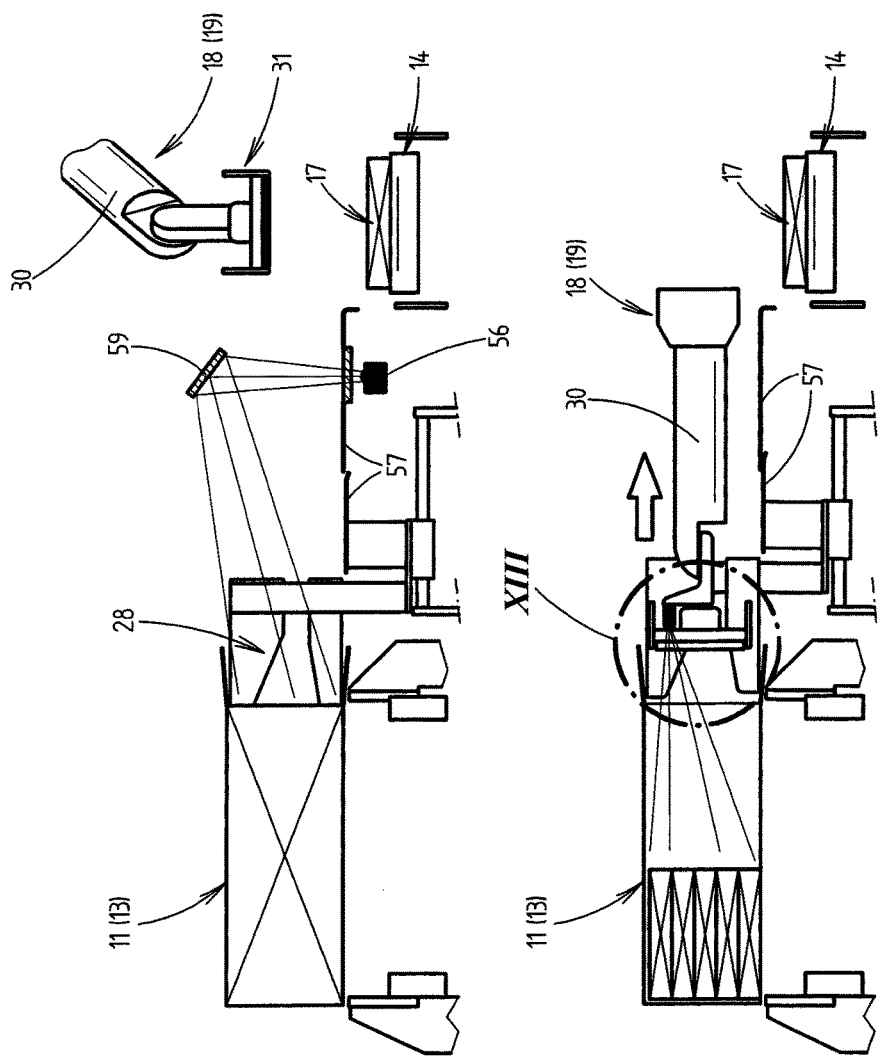

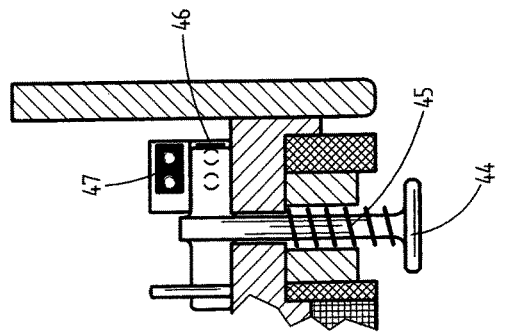
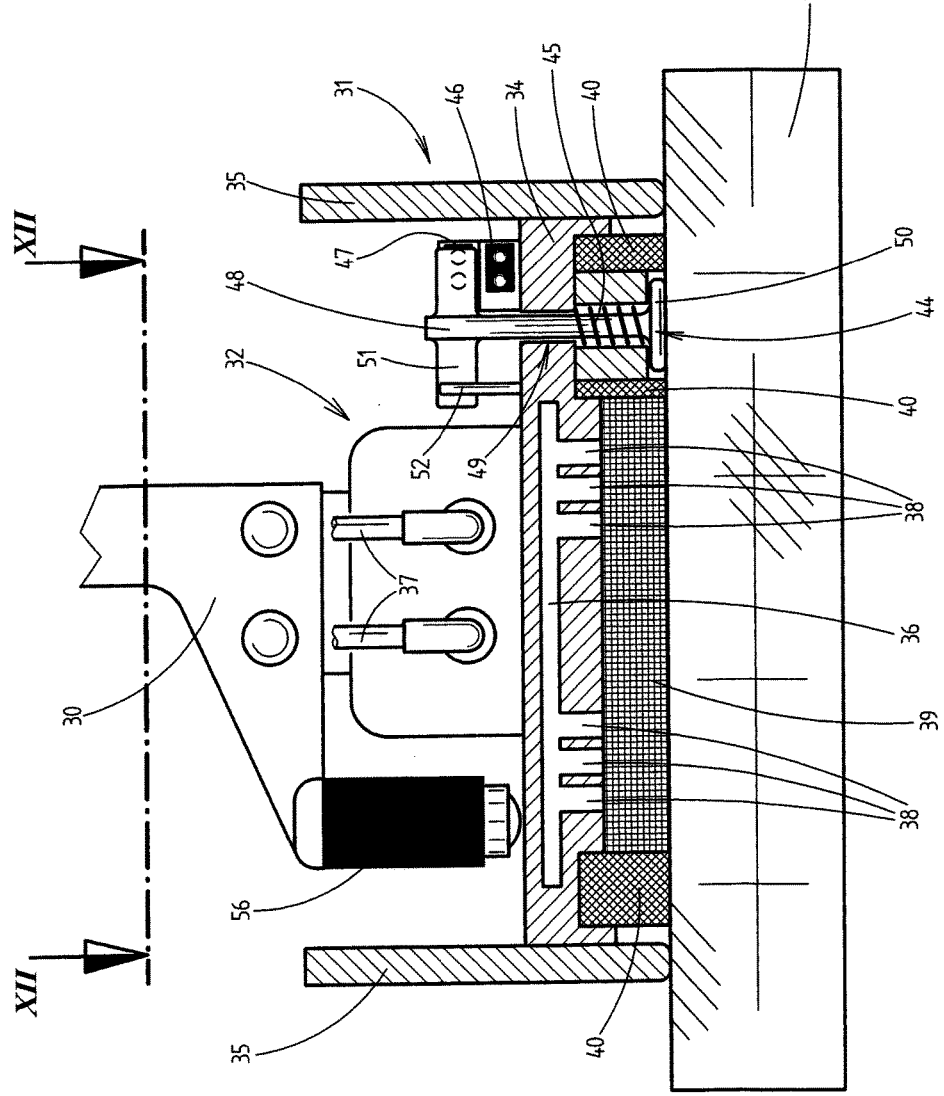

METHOD AND APPARATUS FOR FILLING PACKS WITH PRODUCTS

STATEMENT OF RELATED APPLICATIONS

The application is the US PCT National Phase of International Application No. PCT/EP2013/003051 having an International Filing Date of 10 Oct. 2013, which claims priority on German Patent Application No. 10 2012 022 855.4 having a filing date of 23 Nov. 2012.

BACKGROUND OF THE INVENTION

Technical Field

The invention relates to a method for filling packs with products, in particular for filling boxes with multipacks made up of cigarette packs.

In addition, the invention relates to an apparatus for filling packs with products, in particular for filling boxes with multipacks made up of cigarette packs.

Prior Art

Methods and apparatuses of the type mentioned in the introduction are known from practice in various configurations. A solution from the area of the cigarette industry is shown in DE 10 2004 009 584 A1. The apparatus accordingly comprises a combination of a box packer and a palletizing station in order to insert cigarette multipacks into boxes and to deposit them on pallets. The units put together structurally form one common overall apparatus.

BRIEF SUMMARY OF THE INVENTION

Proceeding from here, the object underlying the invention is to develop methods and apparatuses of the type named in the introduction further, in particular with regard to detecting or documenting the packing process in an improved manner.

A method for achieving said object is a method for filling packs with products, in particular for filling boxes with multipacks made up of cigarette packs, characterized by the following features:
a) several products are put together to form a product group and the completeness of the product group is detected by an in particular first control device,
b) several product groups are put together by means of a handling device to form a group of product groups and are inserted into the pack, wherein the presence of the group in the pack and/or the completeness of the group of product groups is detected by means of an in particular second control device, and
c) the feeding of groups for packing is repeated, where applicable until a provided number of groups have been filled into the pack which corresponds to a required quantity of groups or product groups in the pack, wherein the presence of each group or product group in the pack is detected or documented in each case by means of a control device, in particular by means of the second control device.

Said solution comprises in particular the advantage that the complete process of the grouping of the products up until they are brought into the pack is consequently documented. Consequently, the packing process can be monitored well and in particular it can be ensured that the provided number of products is actually situated in the pack. Consequently, manipulation of the pack contents during the packing process can also be avoided. The documentation of the packing process can also be utilized in relation to customers as proof that the packs were properly filled. The solution according to the invention is preferably used within the framework of a track and trace system.

According to a preferred development of the solution according to the invention, it is provided that the completeness of the product group is tested in the region of the handling device, wherein the presence of individual products inside the product group is tested by both pneumatically operating means and by mechanically operating means.

In this way, it can be reliably checked whether the product group is complete. The advantage of said solution compared to systems that operate in a purely pneumatic manner is that the mechanically operating testing members are not deceived by packing materials, as a result of which the reliability of the test is improved.

According to a preferred exemplary embodiment of the invention, it is provided that the pneumatically operating means and the mechanically operating means are associated with the handling device, wherein for the purpose of controlling the presence of each product inside the product group in a pneumatic manner, said product is acted upon with a negative pressure by means of a negative pressure source, wherein the negative pressure is exerted onto the products in each case through a porous material.

As a result of generating the negative pressure through the porous material, it is possible to distribute the vacuum onto a larger surface, as a result of which the products are treated more gently than usual.

A further characteristic can consist in that the in particular second control device is positioned in the region of the conveying path of the group into the pack and once a group has been supplied into the pack detects said group, wherein the control device, preferably a camera, is arranged in the region of a conveying track for the products and once the group has been conveyed into the pack is moved out of a waiting position that is preferably arranged below the conveying track into a detecting position that is preferably arranged above the conveying track, for detecting the group in the pack, and that the control device is then moved back into the waiting position for feeding a further group into the pack.

As an alternative to this, it can be provided that the in particular second control device is associated with the handling device for feeding the group into the pack, in particular in the region of an arm of a robot for displacing the group into the pack, wherein the group inserted into the pack is detected when the handling device is withdrawn from the pack.

Further details and preferred developments of the method according to the invention can be found in the appended claims and the detailed description of preferred embodiments.

An apparatus for achieving the object is an apparatus for filling packs with products, in particular for filling boxes with multi-packs made up of cigarette packs, characterized by:
a) an in particular first control device is provided for detecting the completeness of several products inside a product group,
b) a handling device is provided for putting together several product groups to form a group of product groups and for inserting the group of product groups into the pack, and
c) an in particular second control device is provided for detecting the presence of the group in the pack and/or the completeness of the group of product groups.

Said solution comprises in particular the advantages disclosed herein.

It is preferably provided that the in particular first control device is associated with the handling device, wherein the handling device comprises both pneumatically operating means and mechanically operating means for testing the completeness of the product group.

The resultant advantages have already been mentioned herein.

In addition, it can be provided in a preferred exemplary embodiment that the handling device is formed by a robot, wherein the robot comprises a head for handling the product groups or groups and the pneumatically operating means and the mechanically operating means are associated with the head.

A further characteristic can consist in that the pneumatically operating means are realized for transferring a negative pressure onto the product group, wherein the negative pressure is exertable onto the product group through a porous material which is arranged in the region of the head.

The advantages produced in this connection have also already been mentioned herein.

A characteristic can additionally be seen in that the head is arranged on an arm of the robot, and that the in particular second control device is arranged on the arm in such a manner that the product group or group is detectable through the head, in particular through a recess in the head.

Said solution comprises in particular the advantage that in the event of a change in format, that is in the event of a modification with regard to the dimensions of the product group or group of product groups to be handled only the head has to be replaced, but the control device can remain on the arm.

An alternative solution to the arrangement of the second control device can provide that that the group of product groups rest on a conveying track and are displaceable along said track by the handling device into a pack that is held in readiness, wherein the in particular second control device is arranged in the region of the conveying track in such a manner that the control device, preferably a camera, once a group has been conveyed into the pack, is movable from a waiting position that is preferably arranged below the conveying track into a detecting position that is preferably arranged above the conveying track for detecting the group in the pack and that the control device is then movable back into the waiting position for feeding a further group into the pack.

A further alternative solution to the arrangement of the second control device can provide that the in particular second control device is arranged outside the conveying path of the groups into the pack, in particular in a fixed position below the conveying track and that the group is detectable in the pack by means of a reflector which is also arranged in a fixed position outside the conveying path of the groups into the pack.

BRIEF DESCRIPTION OF THE DRAWINGS

Further details and preferred developments of the apparatus according to the invention can be found in the appended claims and the detailed description of preferred embodiments. Reference is made is this connection to the accompanying drawings, in which:

FIG. 7 shows an alternative solution to the representation in FIGS. 4 to 6, FIG. 8 shows a further alternative solution to the representation according to FIGS. 4 to 7, FIG. 10 shows a vertical section through the apparatus along the line of intersection X-X in FIG. 9, FIG. 11 shows a control member of the apparatus.

DETAILED DESCRIPTION OF PREFERRED EMBODIMENTS

Figure 1:
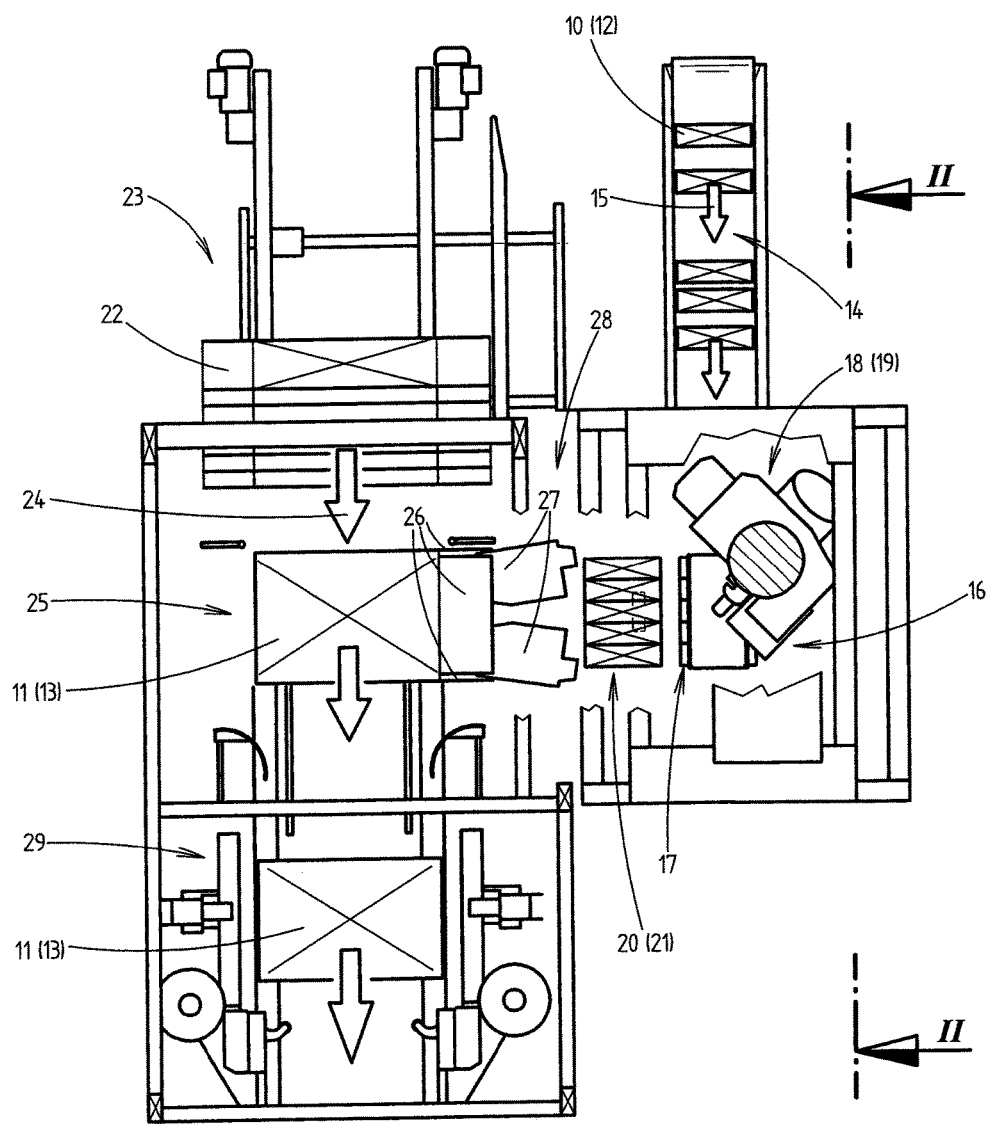
FIG. 1 shows a top view of a packing facility for multipacks made up of cigarette packs.
Figure 2:
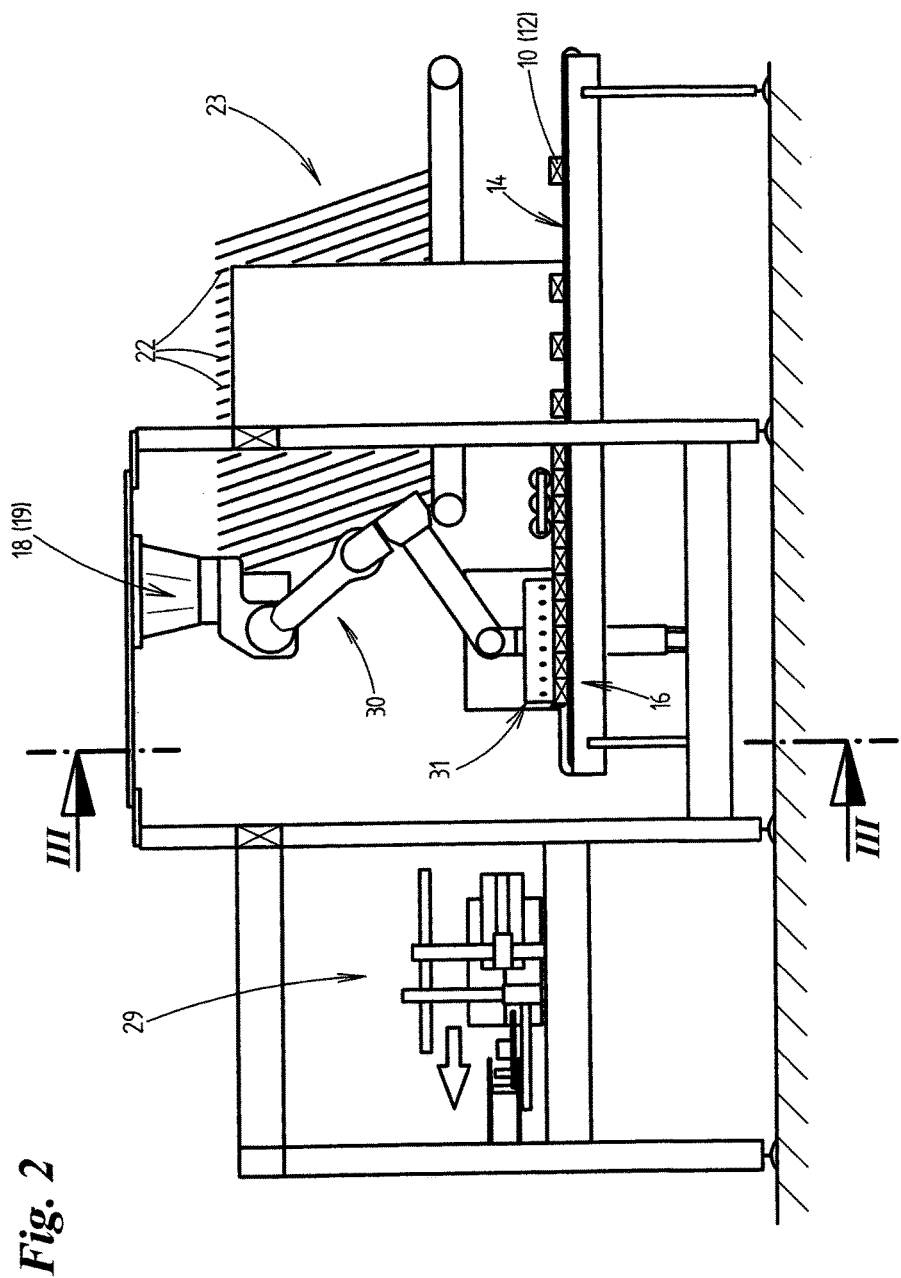
FIG. 2 shows a vertical section through the apparatus along the line of intersection II-II in FIG. 1.
Figure 3:
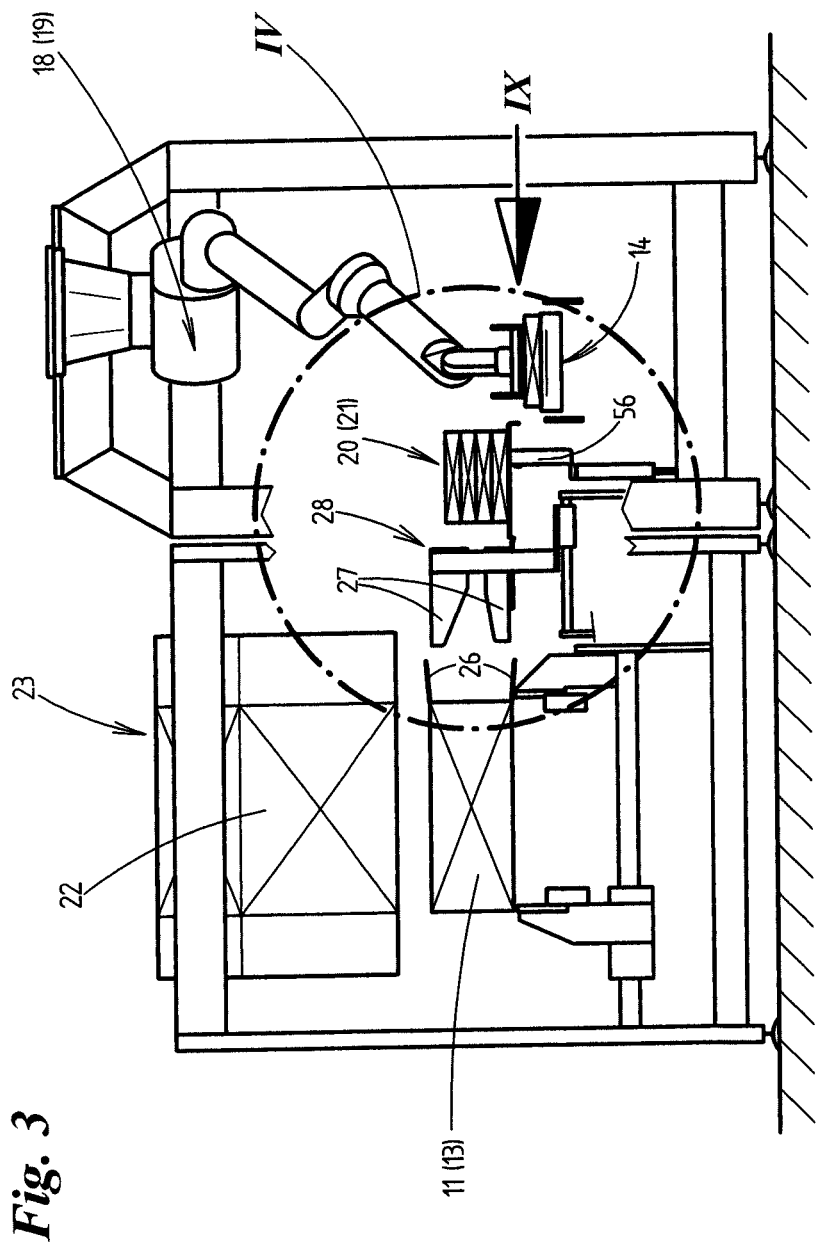
FIG. 3 shows a vertical section through the apparatus along the line of intersection III-III in FIG. 2, FIGS. 4 to 6 show a detail of the apparatus in the region IV in FIG. 3 during various stages of the packing operation.

The invention is described below by way of an apparatus for packing products 10 into a pack 11. The example shown is an apparatus for packing cigarette cartons 12 into a box 13. However, as it does not forcibly have to be cigarette cartons 12 that are packed into a box 13, only the term product 10 or pack 11 will be used below.

The products 10 are supplied on a conveyor 14 in a first conveying direction according to arrow 15 to a grouping station 16 and there are put together to form a product group 17 made up of products 10.

In addition, a handling device 18, in particular in the form of a robot 19, is provided in the grouping station 16. The handling device 18 serves for testing the completeness of the product group 17.

A stack 20 made up of a group 21 of product groups 17 is then formed from several product groups 17 and is preferably transferred transversely with respect to the first conveying direction according to arrow 15 into the pack 11.

Blanks 22 for the pack 11 are held ready in a hopper 23 and are removed in a second conveying direction according to arrow 24 and erected. In a filling station 25, the packs 11 are then held ready for the insertion of one or several groups 21 made up of product groups 17, for example as a box open at one side, fold tabs 26 being held open by means of members 27 of an inserting device 28 in order to be able to insert the products 10 into the pack 11.

Once the pack 11 has been filled, it is conveyed in the direction of arrow 24 into the region of a closing station 29 and is closed.

Further details of the handing of the packs 11 are also to be found in DE 10 2004 009 584 A1, to which reference is made for the purposes of a complete disclosure.

A first characteristic consists in that the handling device 18 or the robot 19 comprises an arm 30 with a head 31, the head 31 preferably being arranged on the end of the arm 30. The arm 30 is preferably realized with multiple members, the individual members being pivotably connected together and the head 31 also being arranged so as to be pivotable on the arm 30 such that the head 31 is able to be moved and also rotated in all directions for handling the products 10.

The handling device 18 has a (first) control device 32 for testing the completeness of the product group 17 that is formed on the conveyor 14. In the present case, the control device 32 is associated with the head 31 of the robot 19 or is arranged in said head. However, it is also conceivable for the control device 32 not to be associated with the handling device 18 or the robot 19, but with other members of the apparatus.

The details of the control device are produced from FIGS. 9 to 15:

the forming of the product group 17 on the conveyor 14 is effected in the exemplary embodiment shown by accumulating the products 10 behind a stop 33 in the region of the conveyor 14. In the present case the product group 17 consists of five cigarette cartons 12. A different configuration of the product group 17 is naturally also conceivable. In the present case, the cigarette cartons 12 consist of cigarette packs which are arranged in two rows each of five packs (FIG. 11). Other configurations are conceivable here too.

The first control device 32 serves for testing the completeness of the product group 17 and has both mechanically operating means and pneumatically operating means. In the present case, both a mechanical means and a pneumatic means are associated with each product 10 inside the product group 17. Where applicable, it is also possible to provide more than one pneumatic means and/or mechanical means per product 10. Where applicable, it is also conceivable for several products 10 to be tested at the same time with a smaller number of means.

The head 31 extends over a large part of the product group 17 (FIG. 12) and has a central base plate 34 and lateral cheeks 35 in the region of the longitudinal sides of the base plate 34. The dimensions of the head 31 and consequently of the base plate 34 as well as of the cheeks 35 is format-dependent, i.e. dependent on the dimensions of the respective product group 17. Consequently, the head 31 can be removed from the arm 30 in order to adapt the apparatus to other formats.

Negative pressure channels 36, which communicate with a negative pressure source (not shown) by means of pneumatic lines 37, are realized in the base plate 31. The negative pressure channels 36 open out with preferably several branch channels 38 in the region of a bottom surface of the base plate 34 and serve for sucking in the product group 17 or the individual products 10 of the product group 17.

It is preferably provided that each product 10 is acted upon with a negative pressure inside the product group 17 by means of several branch channels 38 and is held in this way at the head 31.

Sensors (not shown) are used to test whether the negative pressure is present in the region of all the products 10 of the product group 17. If one or more products 10 are missing, this can be detected in a corresponding manner.

Consequently, together with the branch channels 38, the sensors form the pneumatically operating means of the control device 32.

A further characteristic consists in that the products 10 are not acted upon with a negative pressure directly through the branch channels 38, but through one or several porous suction elements 39. In this way, the negative pressure is distributed onto a larger surface, which results in handling that is more protective of the product.

Figure 14:
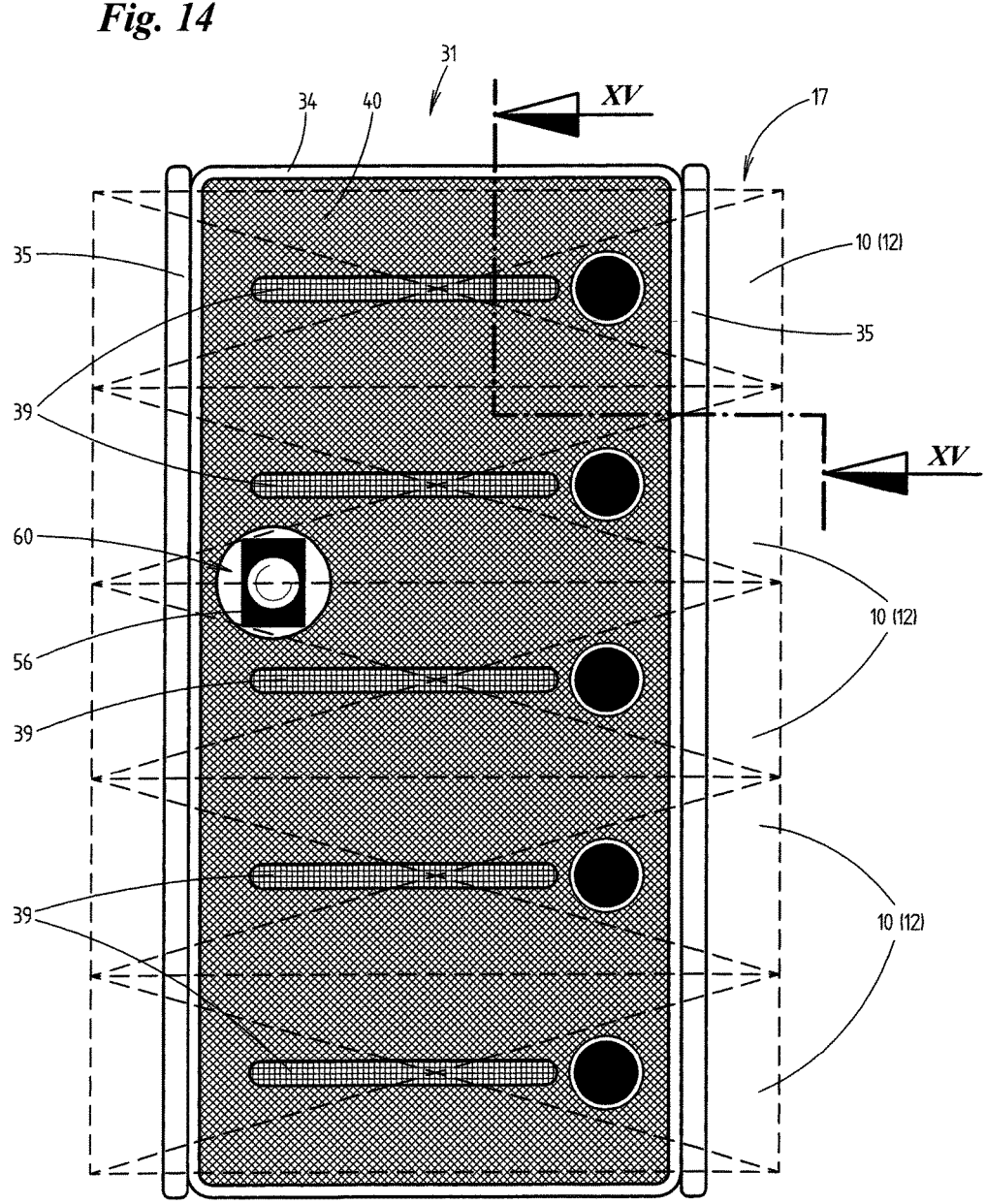
FIG. 14 shows a side view of the apparatus corresponding to the arrow XIV in FIG. 13

In the exemplary embodiment shown, the suction elements 39 are in each case elongated structures which are arranged in such a manner below the base plate 34 that they are arranged approximately in the center (lengthwise) and in the center (crosswise) of the respective products 10 (FIG. 14). The suction elements 39 are surrounded in each case by one or several elastic sealing bodies 40. In the present case, this is a one-part sealing body 40 which extends almost over the entire bottom surface of the base plate 34 and comprises recesses for the respective suction elements 39.

Figure 15:
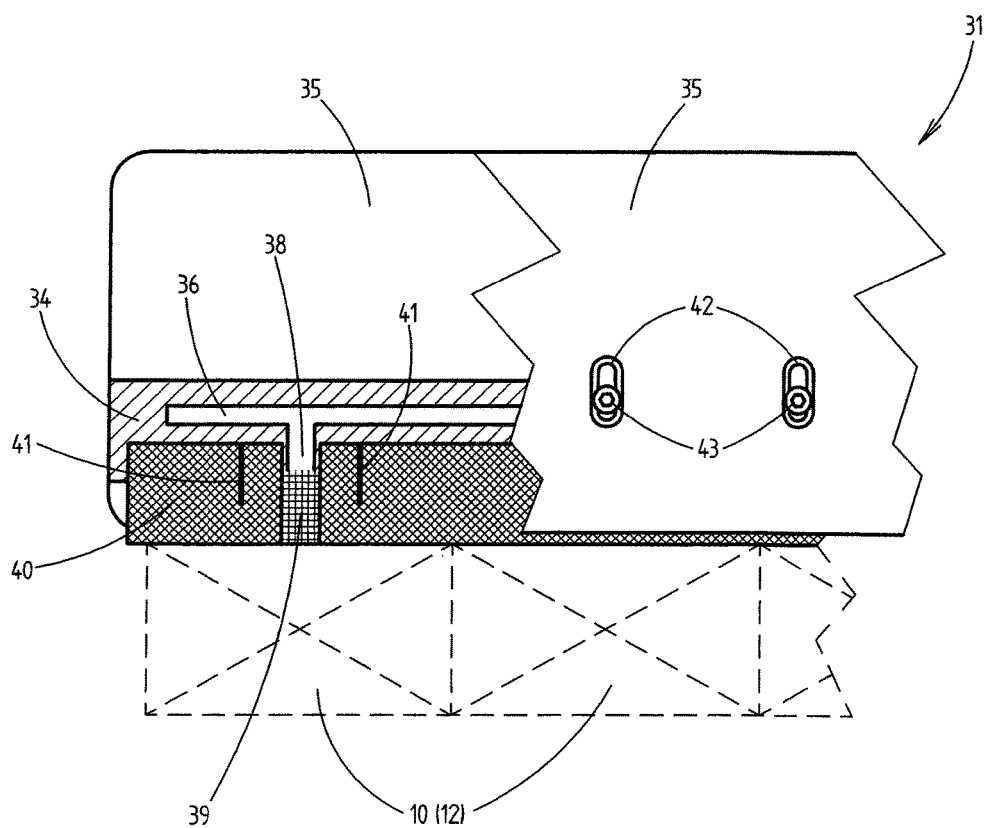
FIG. 15 shows a section through the apparatus along the line of intersection XV-XV in FIG. 14.

A further advantageous detail is shown in FIG. 15. Thus, reinforcement elements 41 are arranged in the sealing body 40 at small lateral spacings to the suction element 39. The reinforcement elements 41 serve for reinforcing the sealing body 40 in the region of the suction elements 39 and, proceeding from an upper surface of the sealing body 40, extend up to approximately beyond half the height of the sealing body 40 in the direction of a bottom surface of the sealing body 40. The reinforcing element 41 can be, for example, one or several web plates or the like. The web plates can surround the suction elements 39 or can be arranged only in regions, for example in the region of the longitudinal sides.

In addition, FIG. 15 shows that the cheeks 35 are adjustable with regard to their position on the base plate 34, namely with regard to the height. For this purpose, at spacings the cheeks 35 comprise elongated holes 42 through which the fastening means 43 engage in the base plate 34.

The mechanically operating means of the control device 32 are described below:

Plungers 44 which are pre-tensioned by means of a spring 45 and which press from above onto the products 10, are arranged in each case in the base plate 34. The force of the spring 45, in this case, is in each case less than the holding force which is exerted on the products 10 by means of negative pressure.

Figure 9:
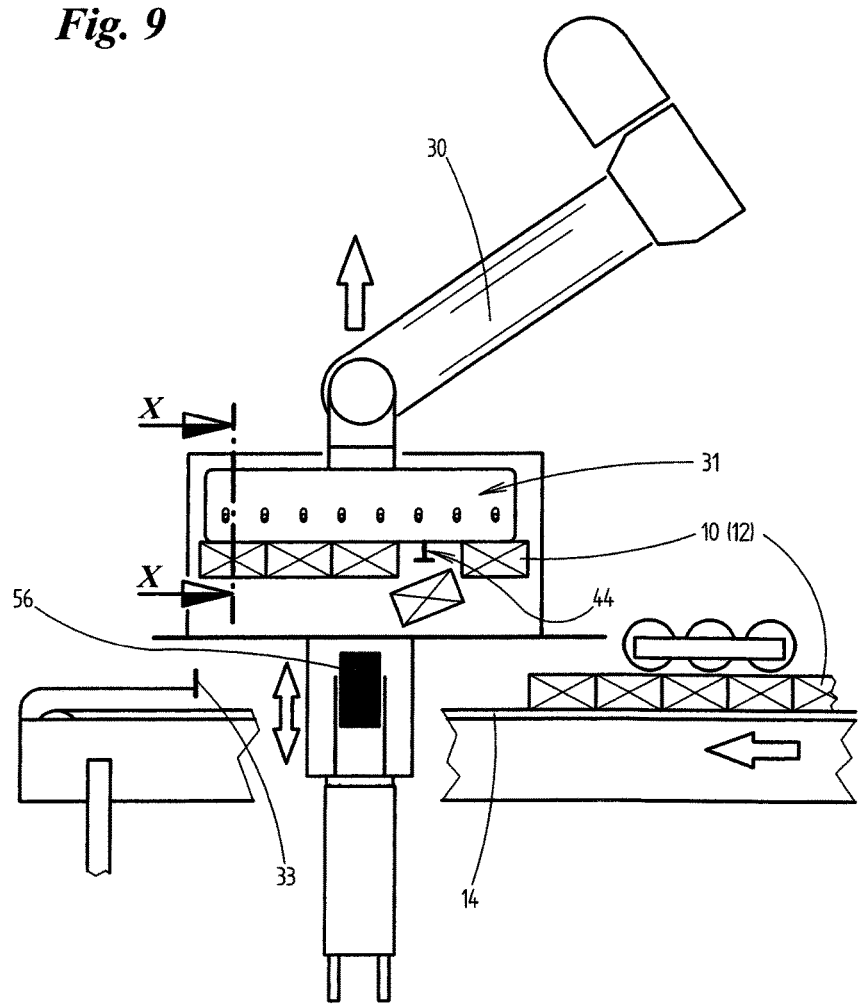
FIG. 9 shows a side view of the apparatus corresponding to the arrow IX in FIG. 3.

If a product 10 is missing (as indicated in FIG. 9), the plunger 44 can be pressed downward by the spring 45, as a result of which a sensor 46 is closed and consequently the lack of a product 10 is recognized (FIG. 11). Where the product 10 is present, the plunger 44 is situated, in contrast, in a top position, as a result of which a further sensor 47 is actuated. Whether the plunger 44 operates correctly and has not jammed can be tested in this way.

Figure 12:
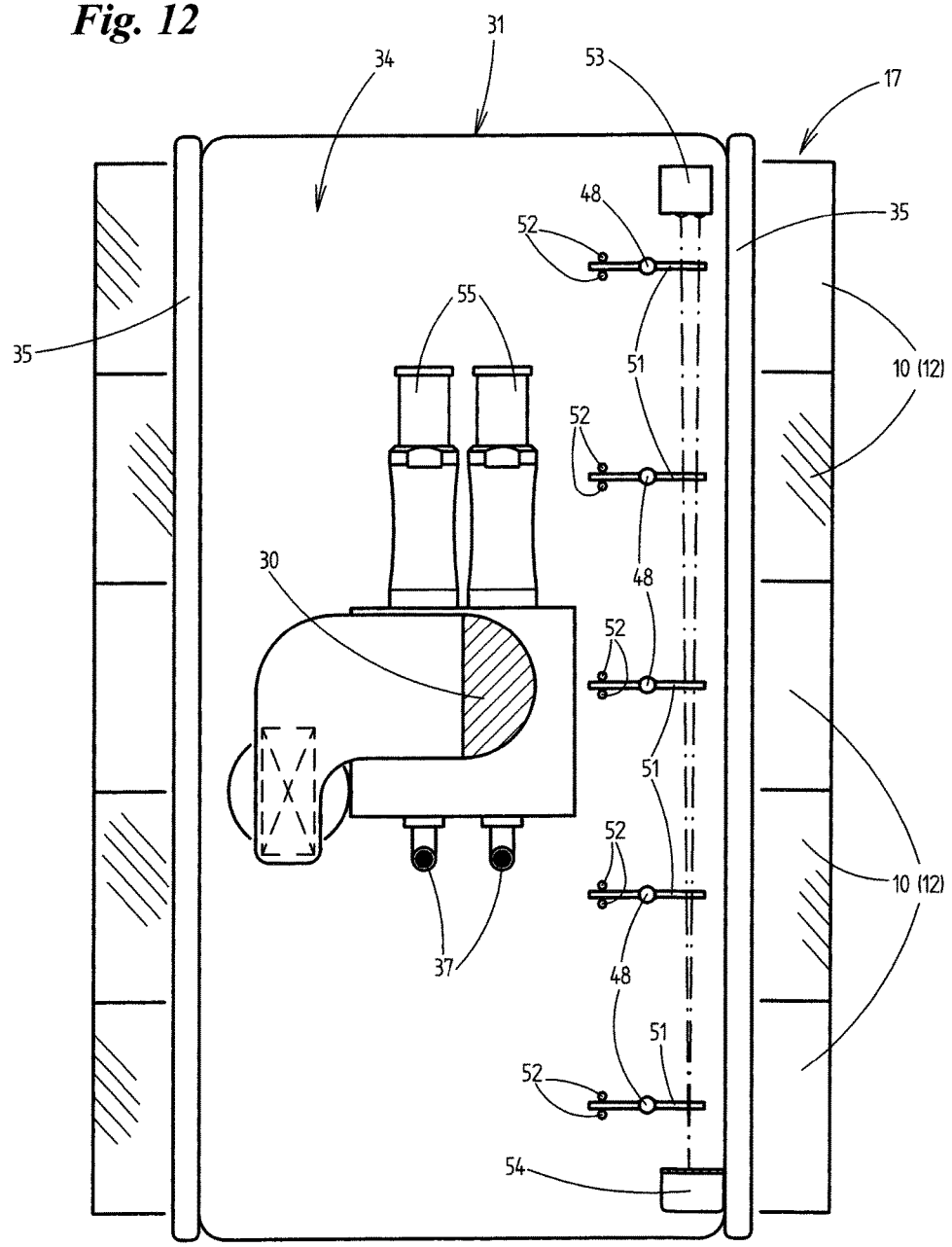
FIG. 12 shows a horizontal section through the apparatus along the line of intersection XII-XII in FIG. 10.

As shown in particular in FIGS. 12 and 14, each product 10 has associated therewith an own plunger 44.

In the present exemplary embodiment, the plunger 44 is realized in the manner of a valve and comprises a central shaft 48 which is guided through a bore 49 of the base plate 34 and on the bottom of which a disk 50 is arranged.

The spring 45 is supported on the rear side of the disk 50 and on the bottom surface of the base plate 34.

A crosswise actuating means 51, which projects laterally into the region of the sensors 46, 47, which are realized as photoelectric barriers in the present case, is provided in the region of the top end of the shaft 48.

In addition, the crosswise actuating means 51 also serves for aligning the plungers 44. For this purpose, the actuating means 51 is held in a guide 52 in order to avoid the plunger 44 twisting.

The photoelectric barrier is realized in the present case as a reflex photoelectric barrier which interacts with a reflector surface 54 (FIG. 12).

In addition, ejectors 55 for generating the vacuum or negative pressure are also shown in FIG. 12.

Figures 4, 5:
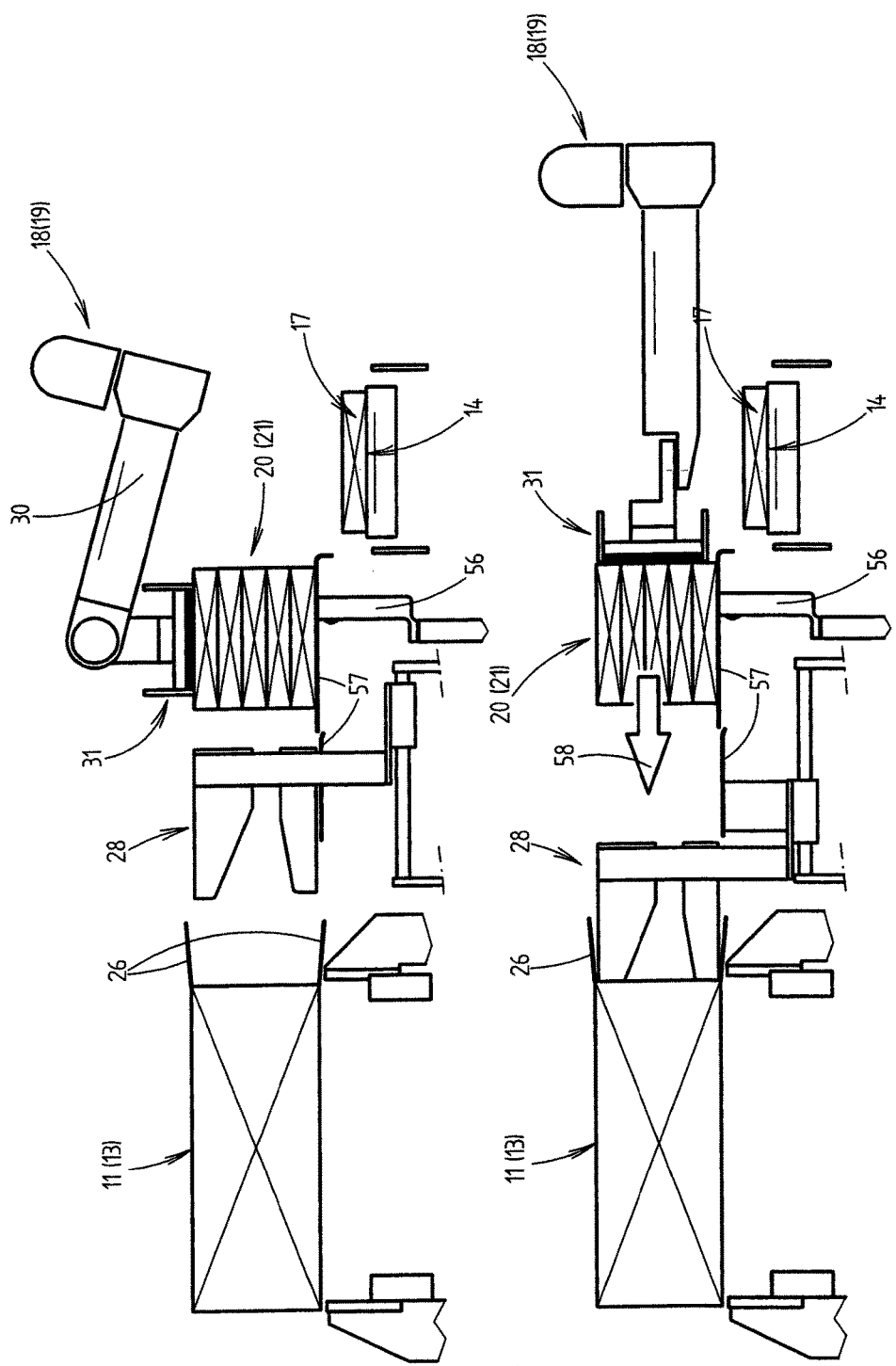
Figure 6:
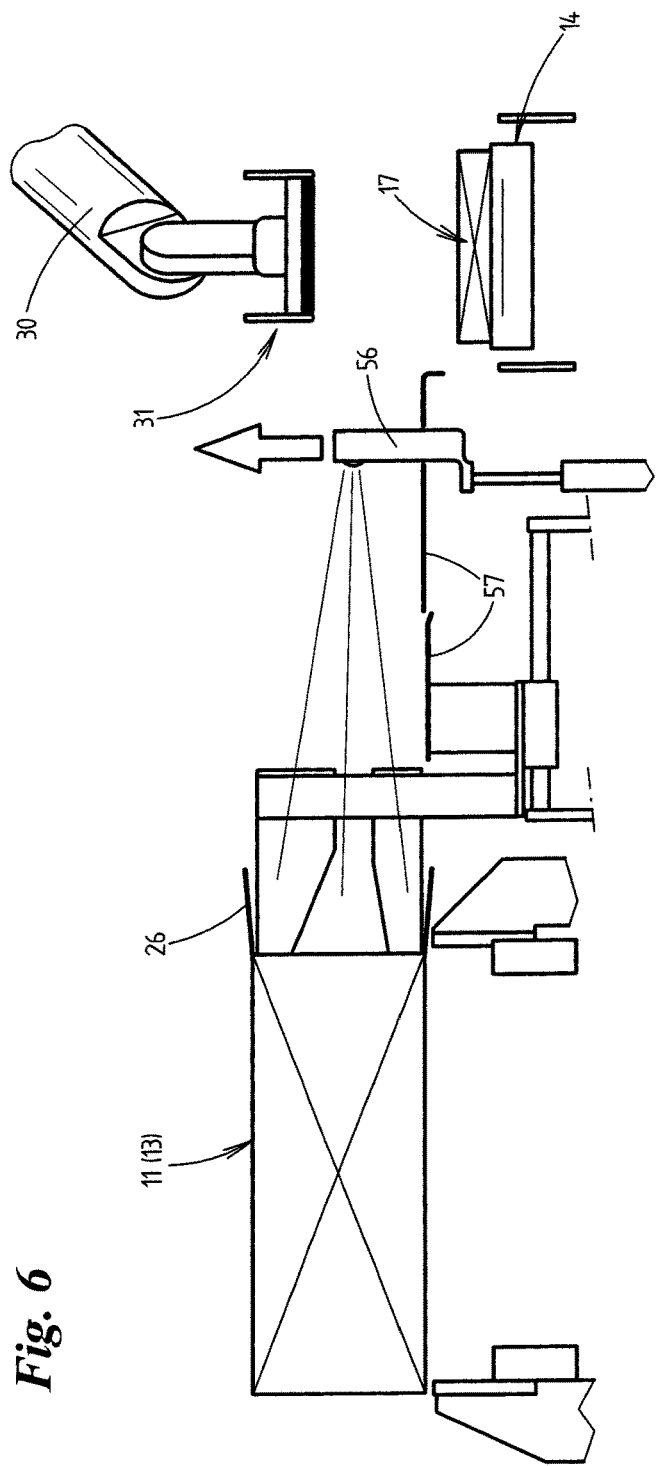

A further characteristic with regard to a (second) control device 56 is described below by way of FIGS. 4 to 8 and 13:

FIGS. 4 to 6 show a first variant of the use of the second control device 56. Thus, the product groups 17 are lifted from the conveyor 14 by means of the handling device 18 and are put together to form a stack 20 or a group 21 of product groups 17 (FIG. 4).

Once the group 21 has been completed, it is pushed by means of the handling device 18 along a conveying track 57 through the inserting device 28 into the open pack 11.

The displacement of the group 21 is preferably effected by the head 31 of the robot 19 which displaces the group 21 to the side. The displacement, in this case, is effected transversely with respect to the conveying direction on the conveyor 14 corresponding to arrow 58.

To insert the group 21 into the pack 11, the inserting device 28 is inserted in part into the open pack 11 such that fold tabs 26 of the pack 11 are held open, the inserting device 28 also bridging the spacing between an end of the conveying wall 27 and the pack 11.

Once the group 21 has been inserted into the pack 11, the handling device 18 is withdrawn from the conveying path of the groups 21 such that the contents of the pack 11 are able to be detected. For this purpose, the second control device 56, for example in the form of a camera, is moved out of a waiting position below the conveying track 57 (FIGS. 4 and 5) into a detecting position above the conveying track (FIG. 6) and the contents of the pack 11 are detected, for example by taking a photo of the open pack 11. The control device 56 is then moved back into the initial position, namely into the waiting position.

FIG. 7 shows an alternative solution where the second control device 56 is arranged in a fixed position below the conveying track 57. The contents of the pack 11 are detected through a recess in the conveying track 57 above the control device 56 (which, where applicable, can be filled with a glass screen) by means of a reflector 59, for example a mirror, which is arranged above the conveying track 57.

Figure 13:
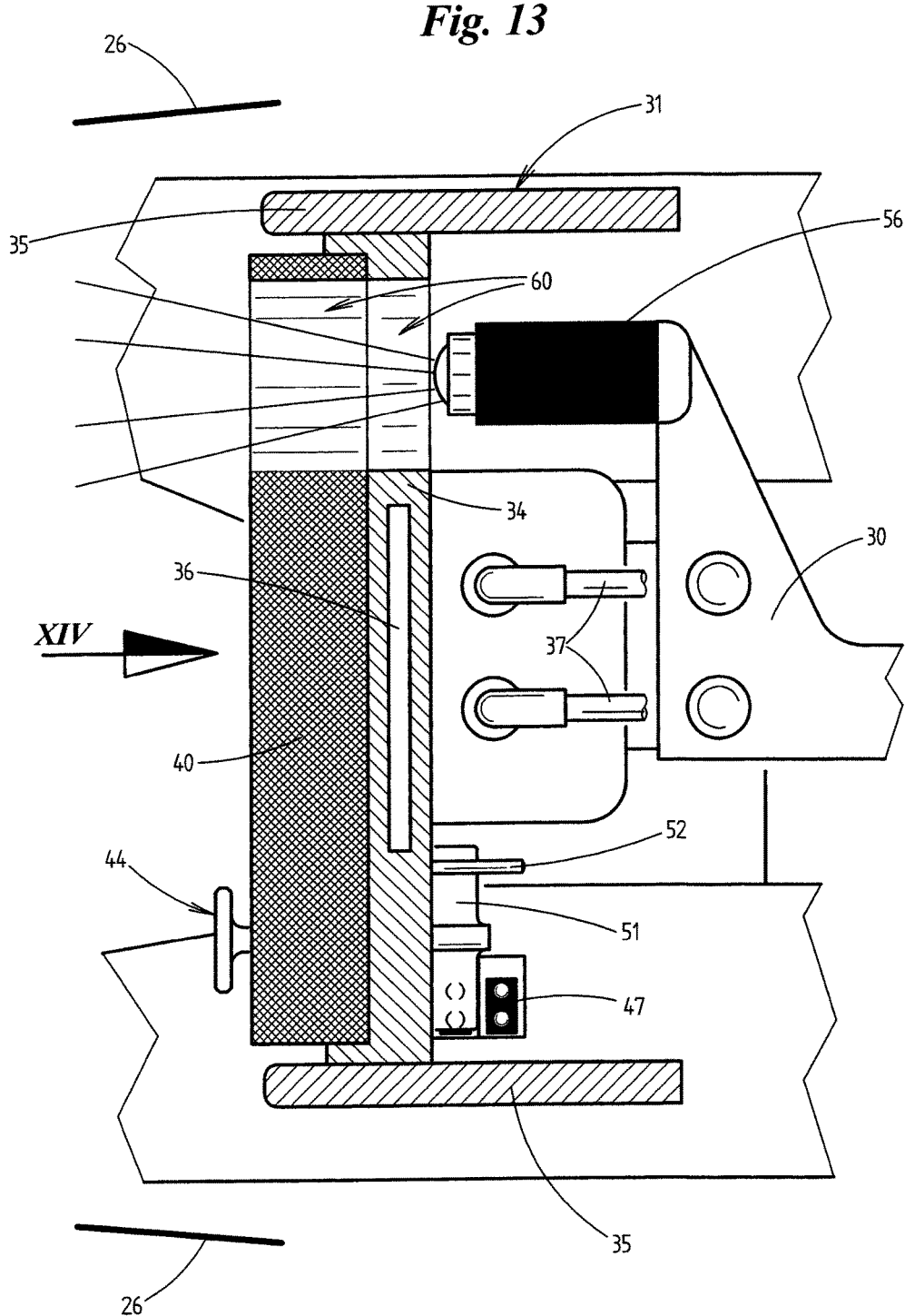
FIG. 13 shows a vertical section through the apparatus when detecting product groups.

A third variant is shown in FIGS. 8 and 13. In this case, the control device 56, for example a camera, is arranged on the arm 30 of the handling device 18, namely in the region of the head 31. The detecting of the contents of the pack 11 is effected in this case through a recess 60 in the base plate 34 and in the sealing body 40, preferably when the arm 30 is withdrawn from the pack 11 (FIG. 8).

By means of the two control devices 32, 56, the packing process can be completely monitored, namely proceeding from the forming of the product groups 17 up to the insertion of the groups 21 made up of product groups 17 into the pack 11. If several groups 21 are to be inserted into the pack 11, the process of forming the group 21 and displacing with subsequent detection is repeated until the required quantity of products 10 is situated in the pack 11. In this way, it is possible to provide proof in relation to a customer that the pack 11 has been properly filled with products 10. In addition, said solution enables in particular the proof that each group 21 has been properly and completely filled into the pack 11. Consequently, the proof that only correct products 10 are situated inside a larger pack 11 can also be provided. The solution according to the invention consequently enables seamless proof even when the groups 21 that are filled one after another are obscured in part or completely.

In addition, in the course of a track and trace system it can be ensured that the camera images taken are associated with the products 10 or the pack 11.

In addition, it can be ensured in a suitable manner that once the pack contents have been photographed, it is no longer possible to interfere in the packing process and where applicable to remove products 10. If this is done, for example to eliminate a fault, the pack 11 is correspondingly marked and can then, if necessary, no longer be available for the further packing process.

It is obvious that it can naturally be sufficient in individual cases to provide only one of the two control devices 32, 56.

In addition, it is conceivable for the second control device 56 to be used for the purpose of detecting both the product groups 17 and the groups 21. Consequently, it could be possible to dispense with the first control device 32. The second control device 56 could be arranged in the head 31, as shown, and detect the product group 17 for example on the conveyor 14.

Over and above this, it is not absolutely necessary for several groups 21 to be inserted into the pack 11. The pack contents can also consist of only one group 21.

In addition, cases are also imaginable where it is possible to dispense with forming product groups 17 and the products 10 are thus conveyed into the pack 11 directly or once a stack 20 is formed.

Obviously, the products 10 do not have to be cigarette cartons 12 or multipacks. Cigarette packs or other objects are also possible as products 10.

LIST OF REFERENCES

10 Product
11 Pack
12 Cigarette carton
13 Box
14 Conveyor
15 Arrow
16 Grouping station
17 Product group
18 Handling device
19 Robot
20 Stack
21 Group
22 Blanks
23 Hopper
24 Arrow
25 Filling station
26 Fold tab
27 Member
28 Inserting device
29 Closing station
30 Arm
31 Head
32 Control device
33 Stop
34 Base plate
35 Cheek
36 Negative pressure channel
37 Pneumatic feed line
38 Branch channel
39 Suction element
40 Sealing body
41 Reinforcing element
42 Elongated hole
43 Fastening means
44 Plunger
45 Spring
46 Sensor
47 Sensor
48 Shaft
49 Bore
50 Disk
51 Actuating means
52 Guide
53 Reflex photoelectric barrier
54 Reflector surface
55 Ejector
56 Control device
57 Conveying track
58 Arrow
59 Reflector
60 Recess

What is claimed is:

1. A method for filling a pack with products, the method comprising:
   a) putting together several products to form a product group and detecting the completeness of the product group by a first control device;
   b) putting together several product groups by means of a handling device to form a group of product groups that is inserted into the pack, and detecting the presence of the group of product groups in the pack and/or the completeness of the group of product groups by means of a second control device;
   c) repeating the inserting of the group of product groups into the pack as necessary until a provided number of groups of product groups have been inserted into the pack which corresponds to a required quantity of the groups of product groups or of the product groups in the pack, and detecting or documenting the presence of each group of product groups or of each product group in the pack in each case by means of the second control device; and
   d) testing the completeness of each group of product groups or of each product group in a region of the handling device, wherein the presence of individual products inside the group of product groups or the product group is tested by both pneumatically operating means and by mechanically operating means.

2. The method as claimed in claim 1, wherein the pneumatically operating means and the mechanically operating means are associated with the handling device, wherein for testing for the presence of each product inside the product group in a pneumatic manner, said product is acted upon with a negative pressure by means of a negative pressure source, wherein the negative pressure is exerted onto the products in each case through a porous material by a suction element.

3. The method as claimed in claim 1, wherein the second control device is positioned in a region of a conveying path of the group of product groups into the pack and once the group of product groups has been inserted into the pack, the second control device detects said group of product groups, wherein the second control device is arranged in a region of a conveying track for the products and, after the group of product groups has been conveyed into the pack, is moved out of a waiting position and into a detecting position for detecting the group of product groups in the pack, and wherein the second control device is then moved back into the waiting position for feeding a further group of product groups into the pack.

4. The method as claimed in claim 1, wherein the second control device is associated with the handling device, in a region of an arm of a robot for displacing the group of product groups into the pack, wherein the group of product groups inserted into the pack is detected when the handling device is withdrawn from the pack.

5. An apparatus for filling a pack with products, the apparatus comprising:
   a) a first control device for detecting the completeness of a product group comprising several products;
   b) a handling device for putting together several product groups to form a group of product groups and for inserting the group of product groups into the pack; and
   c) a second control device for detecting the presence of the group of product groups in the pack and/or the completeness of the group of product groups,
   wherein the first control device is associated with the handling device, and
   wherein the handling device comprises both pneumatically operating means and mechanically operating means for testing the completeness of the group of product groups.

6. The apparatus as claimed in claim 5, wherein the handling device is a robot, wherein the robot comprises a head for handling the product groups or the group of product groups and the pneumatically operating means and the mechanically operating means are associated with the head.

7. The apparatus as claimed in claim 6, wherein the pneumatically operating means is realized for transferring a negative pressure to the product groups, wherein the negative pressure is exertable onto the product groups through a porous material by a suction element which is arranged in a region of the head.

8. The apparatus as claimed in claim 6, wherein the head is arranged on an arm of the robot, and wherein the second control device is arranged on the arm in such a manner that each product group or each group of product groups is detectable through a recess in the head.

9. The apparatus as claimed in claim 5, wherein the group of product groups rests on a conveying track and is displaceable along said conveying track by the handling device into the pack, wherein the second control device is arranged in a region of the conveying track in such a manner that the second control device, once the group of product groups has been conveyed into the pack, is movable from a waiting position to a detecting position for detecting the group of product groups in the pack, and wherein the second control device is then movable back into the waiting position for feeding a further group of product groups into the pack.

10. The apparatus as claimed in claim 5, wherein the second control device is arranged outside a conveying path of the group of product groups into the pack, in a fixed position below a conveying track on which the group of products groups rests, and wherein the group of product groups is detectable in the pack by means of a reflector which is also arranged in a fixed position outside the conveying path of the group of product groups into the pack.

* * * * *